United States Patent [19]

Holzhauser et al.

[11] 4,350,329
[45] Sep. 21, 1982

[54] SHEET FEEDING APPARATUS

[75] Inventors: Ronald C. Holzhauser, Holley; James A. McGlen; Matthew J. Russel, both of Rochester, all of, NY

[73] Assignee: Eastman Kodak Company, Rochester, N.Y.

[21] Appl. No.: 172,340

[22] Filed: Jul. 25, 1980

[51] Int. Cl.³ .............................................. B65H 3/44
[52] U.S. Cl. ........................................ 271/9; 271/301
[58] Field of Search ....................... 271/3.1, 9, 149, 4, 271/301

[56] References Cited

U.S. PATENT DOCUMENTS

| | | | |
|---|---|---|---|
| 3,930,725 | 1/1976 | Jones | 271/9 X |
| 4,076,408 | 2/1978 | Reid . | |
| 4,078,787 | 3/1978 | Burlew . | |
| 4,093,372 | 6/1978 | Guenther | 271/3.1 X |
| 4,169,674 | 10/1979 | Russel . | |
| 4,176,945 | 12/1979 | Holzhauser . | |
| 4,229,101 | 10/1980 | Hamlin | 271/3.1 X |
| 4,253,652 | 3/1981 | Steinhilber | 271/9 |
| 4,253,759 | 3/1981 | Rattin | 271/3.1 X |

OTHER PUBLICATIONS

IBM Technical Disclosure Bulletin, vol. 19, No. 3, pp. 802–803, Aug. 1976.

Primary Examiner—Richard A. Schacher
Attorney, Agent, or Firm—G. Herman Childress

[57] ABSTRACT

Document feeding apparatus feeds document sheets to an exposure position along a recirculating sheet path or along a non-recirculating sheet path. The feeding means has a vacuum belt for moving a sheet traveling along either sheet path past the exposure position. A document sheet can be fed to the belt for advancement to the exposure position through a slot located in a generally vertically disposed orientation and having an opening at the lower end thereof adjacent to the belt. Preferably, registration means are provided adjacent the belt at the lower end of the slot for preregistering the lower edge of a document sheet being fed through the slot to the belt. Rollers are provided for urging the document sheet against the belt, both when sheets are fed to the belt in a non-recirculating (document positioner) mode and when sheets are fed in the recirculating feeder mode of operation. One set of rollers, which is used for holding a sheet against the belt when in the non-recirculating mode of operation, is held in a retracted or disengaged position when the apparatus is operating in the document positioner mode of operation.

9 Claims, 8 Drawing Figures

SHEET FEEDING APPARATUS

BACKGROUND OF THE INVENTION

This invention relates generally to sheet feeders and, more specifically, to an improved document positioner apparatus that is particularly useful in a combination recirculating document feeder and document positioner.

It is known in the art to provide document sheet feeder apparatus wherein either simplex or duplex document sheets can be fed to a platen of a copier/duplicator or the like for copying by a recirculating feeder and to provide, in combination therewith, a document positioner useful for feeding one or more document sheets to the platen for copying one or more times, and then removing such sheets from the platen along a nonrecirculating sheet path. For example, such apparatus is disclosed in the commonly assigned U.S. Pat. No. 4,176,945 which issued on Dec. 4, 1979 in the names of R. Holzhauser et al. and is entitled *SHEET FEEDING APPARATUS FOR USE WITH COPIER/DUPLICATORS OR THE LIKE,* and in the copending U.S. patent application Ser. No. 172,339 entitled *SHEET FEEDING APPARATUS* filed on even date herewith in the name of R. Holzhauser. With respect to U.S. Pat. No. 4,176,945, reference is also made to a related publication appearing in item No. 17451 on pages 44–48 of Vol. 173 (September 1978 Edition) of Research Disclosure, published by Industrial Opportunities, Ltd., Homewell, Avant Hamsphire, P.O. 9-1EF, United Kingdom. As explained in U.S. Pat. No. 4,176,945, sheets of a document are fed seriatim to an exposure station by recirculating feeder structure to produce one or more collated sets of copies of the document. The document positioner apparatus can be used for feeding individual document sheets to the exposure station for copying one or more times.

In the sheet feeding apparatus disclosed in U.S. Pat. No. 4,176,945 and the related Research Disclosure publication the document positioner apparatus is located relative to the position normally occupied by the machine operator so that the document sheets are fed to the document positioner apparatus by the right hand of the machine operator while the operator is near the control panel of the copier/duplicator. This is considered desirable not only because most people are right handed but also because of the desirability of minimizing movements of the machine operator when various functions are being performed. However, in the apparatus disclosed in the copending U.S. application Ser. No. 172,339 the document positioner apparatus is located so that the machine operator may need to move away from the control panel to use the document positioner. Accordingly, it is desirable to provide document positioner apparatus which can be used with the recirculating feeder disclosed in the beforementioned U.S. patent application Ser. No. 172,339 and which will allow the machine operator to feed document sheets to the document positioner conveniently and without leaving the usual operator position near the control panel.

SUMMARY OF THE INVENTION

In accordance with the present invention a sheet feeding apparatus is provided having a sheet transport mechanism comprising a belt supported by a ring and moveable around the ring. The improvement comprises means defining a generally vertically disposed slot. The slot has an opening at the top for receiving a sheet and an opening at the bottom located adjacent to the belt for delivering a sheet to the belt. Means also are provided adjacent to the bottom of the slot for urging the sheet toward the belt.

BRIEF DESCRIPTION OF THE DRAWINGS

In the detailed description of the preferred embodiments of the invention presented below reference is made of the accompanying drawings, in which.

DESCRIPTION OF THE PREFERRED EMBODIMENTS

Figure 1:
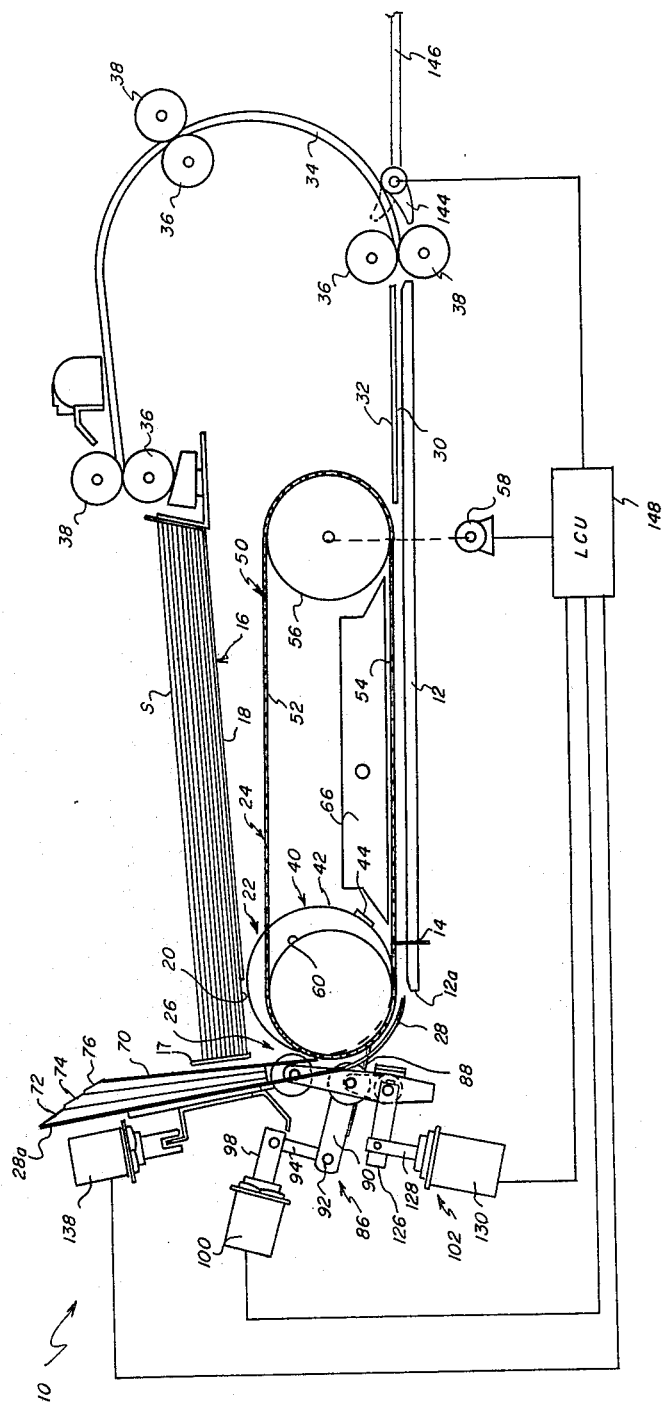
FIG. 1 is a schematic elevation view, partially in cross-section, illustrating a simplex sheet feeding apparatus incorporating the improvements of the present invention.

Referring now to FIG. 1 of the drawings, sheet feeding apparatus of the present invention is generally designated 10 and, for purposes of illustration, will be described in connection with the feeding of simplex document sheets S to a platen 12. A "simplex document sheet" is a sheet having information to be copied on only one side or face of the sheet. The platen 12 comprises part of a document copying apparatus, such as a copier/duplicator of the type disclosed in more detail in commonly assigned U.S. Pat. Nos. 4,076,408, 4,078,787 and 4,169,674. When a sheet S has been delivered to platen 12 it is located at a registration position on the platen for copying. The sheet, when in the registration position, has one of its edges located along a line shown at 14 in the drawings. Line 14 is adjacent and generally parallel to one edge 12a of the platen. When the sheet is thus registered on the platen it is exposed by flash lamps (not shown) to produce an image of the document sheet on a photoconductor. The image is then processed and transferred to a copy sheet by suitable electrophotographic apparatus, for example.

The recirculating feeder portion of apparatus 10 can be the same as or similar to the corresponding feeder disclosed in the beforementioned U.S. patent application Ser. No. 172,339 filed on even date herewith. Accordingly, reference is made to such application for a more detailed description of the recirculating feeder.

The recirculating feeder comprises a tray 16 that is located above the platen 12 and is adapted to receive and hold a stack of document sheets S that are to be copied. Tray 16 has a bottom 18 which supports the sheets, and there is an opening 20 in the tray bottom through which sheets are removed seriatim, beginning with the bottommost sheet in the stack, and delivered to the platen 12 for copying. Preferably the bottom 18 of the tray is sloped downwardly toward the opening 20 so that the sheets are urged toward the left wall 17 of the tray (as viewed in FIG. 1) by gravity. In addition, side joggers and end joggers (not shown) can be provided for aligning the document sheets and urging them against the left wall 17 of the tray. Thus the sheets are registered against wall 17. Sheets S are placed in the tray in their normal page sequence order with the top sheet being the first page of the document and with the bottom sheet comprising the last page of the document. The information to be copied on each document sheet faces upwardly in the tray. As the sheets are removed from the bottom of the stack in the tray 16 the last document page or sheet is removed first and the first document page or sheet is removed last.

Sheet removing means 22 is located adjacent the opening 20 in the bottom of the tray and is effective to remove from the tray the bottommost sheet S in the tray and to feed it to a sheet transport mechanism generally designated 24. Opening 20 in the tray allows the bottommost sheet S to rest directly on the outer surface of the sheet removing means 22. Mechanism 24 delivers the document sheet removed from the tray to the platen 12 so that it can be exposed and copied. Mechanism 24 advances the sheet across the platen in a left-to-right direction, i.e., in a direction extending away from edge 12a of the platen so that the trailing edge of the sheet reaches edge 12a of the platen after the leading edge. In the process of removing a sheet from the tray and delivering it to the platen 12 the sheet is fed through a guide path 26 defined by the sheet removing means 22, the sheet transport mechanism 24 and a sheet guide 28. A sheet traveling from tray 16 to the platen 12 is inverted once prior to being copied so that the upper face of the sheet in the tray 16 faces downwardly on platen 12 for copying.

After the sheet has been copied, it is driven by the sheet transport mechanism 24 into a slot 30 that is above the platen, and below mechanism 24 and a backing plate 32. Then the sheet is delivered into an inverting sheet path 34. Transport of the sheet through the path 34 is effected by pairs of drive rollers 36 and idler rollers 38. When the sheet reaches the upper end of path 34, it is directed into the tray 16 on top of any other sheets that remain in the tray. The direction taken by the sheet as it leaves path 34 is determined, in part, by the relationship between the last pair of rollers 36, 38. Thus the sheet is directed downwardly into the tray by locating the axis of roller 36 slightly to the right of a vertical plane through the axis of roller 38. It is apparent from the foregoing description that the document sheet is inverted twice in the process of being removed from the bottom of the tray, circulated to the platen and returned to the top of the tray. Because the sheet is inverted an even number of times, the same side of the sheet faces upwardly in the tray before its removal for copying and after it is returned to the tray.

The sheet removing means 22 comprises an oscillating vacuum feeder tube (OVF) generally designated 40. Tube 40 has a plurality of axially-aligned tubular sections 42 that are connected together for conjoint movement by a tie-bar 44. Three such sections 42 can be provided, for example. A rotational movement applied to any of the tube sections is imparted to the other tube sections through the tie-bar 44. The tube can be oscillated in any suitable manner, such as conventionally done in connection with prior oscillating vacuum tube feeders.

The tube sections 42 have a series of axially aligned ports 46 that are located on the tube sections with respect to the tray 16 to provide a path for fluid flow from the exterior surface of the tube sections 42 through the ports into the tube sections when the tube sections are connected to a vacuum source. The tube sections initially are located at a "rest" position, illustrated in FIGS. 1 and 2, wherein the ports 46 are beneath opening 20 in tray 16. When the sections are in the "rest" position, a sheet S in tray 16 located immediately above the ports is attracted to the tube sections in response to the application of vacuum through the ports. This tacks the sheet to the tube sections. Then the tube is rotated in a counterclockwise direction (as viewed in FIGS. 1 and 2) to initiate withdrawal of a sheet S from the tray 16. After the tube sections have rotated about 30°, the leading edge portion of the sheet can be advanced by the sheet transport mechanism 24 as explained later. Accordingly, the vacuum supply to the OVF is interrupted and the tube sections are then rotated in a clockwise direction back to the initial or rest position. After one document sheet has been fully removed from the tray the vacuum supply can again be applied to remove the next sheet from the tray.

The sheet transport mechanism 24 comprises one or more endless vacuum belts 50 that are located between the tray 16 and platen 12. Preferably, one vacuum belt is provided between each two adjacent sections 42 of the OVF. Each belt 50 has an upper reach 52 and a lower reach 54 which are substantially parallel to each other and disposed in a generally parallel relationship with the platen. The lower reach 54 is immediately above platen 12 and it is separated therefrom by the slot 30. The slot is large enough to allow vacuum to hold a sheet S against the reach 54 of the belts for transport across the platen. Each belt has a multiplicity of small holes therethrough so that a vacuum can be applied to a sheet through the belt holes.

Belts 50 are supported by a cylindrical drive roller 56 which is rotated from a motor 58 shown coupled diagrammatically to the roller in FIG. 1. Each belt 50 also is supported by a cylindrical ring 60. One ring is located between each two adjacent oscillating vacuum tube sections 42. The rings have ports 62 therethrough so that a vacuum can be applied through the ports 62 to the vacuum belts to hold a sheet to the belts as the belts travel around the rings. Each ring rotates about a baffle 64 that allows vacuum to be applied only through about 135° of the rings, such being sufficient to hold a sheet to the belts from the point where the sheet is received from the OVF to a point where the belts separate from the rings and begin moving over the platen 12. At this time the sheet is attracted to the belts by vacuum applied through the belts from a vacuum plenum 66. When the sheet leaves the influence of plenum 66, it travels through slot 30 and into the nip of rollers 36, 38 for transport through path 34.

The rings are rotated about their axis by the belts when the belts are driven by roller 56. The rings have substantially the same outside diameter as the tube sections 42; however, the axes of the tube sections and rings are offset from each other. Therefore, a sheet to be removed from the tray is first attracted to the portions of the tube sections that project above the rings and the belts 50 supported by the rings. Then, in response to counterclockwise movement of the tube sections, the sheet is transferred to the belts at the point where the belts travel over the portion of the rings that project to the left beyond the tube sections. During this transfer of the sheet from the tube sections to the belts the sheet remains under the control of vacuum from the OVF or the belts so that the sheet does not become skewed. Vacuum to the OVF is interrupted (reduced to zero) at the time in the cycle when the sheet can be advanced by the vacuum belts.

As mentioned earlier, a more complete description of the recirculating feeder structure described hereinbefore can be found in the beforementioned copending U.S. patent application Ser. No. 172,339 filed on even date herewith. The document positioner apparatus disclosed in that copending application had a sheet inlet located at the left side of the edge 12a of the platen, as viewed in FIG. 1, and relative to a machine operator. This location may be somewhat inconvenient relative to the control panel. In accordance with the present invention, document sheets can be fed by the operator through a generally vertically disposed guide slot that leads to the sheet transport mechanism, thereby simplifying the feeding of document sheets for the operator. This sheet feeding apparatus will now be described.

Figure 2:
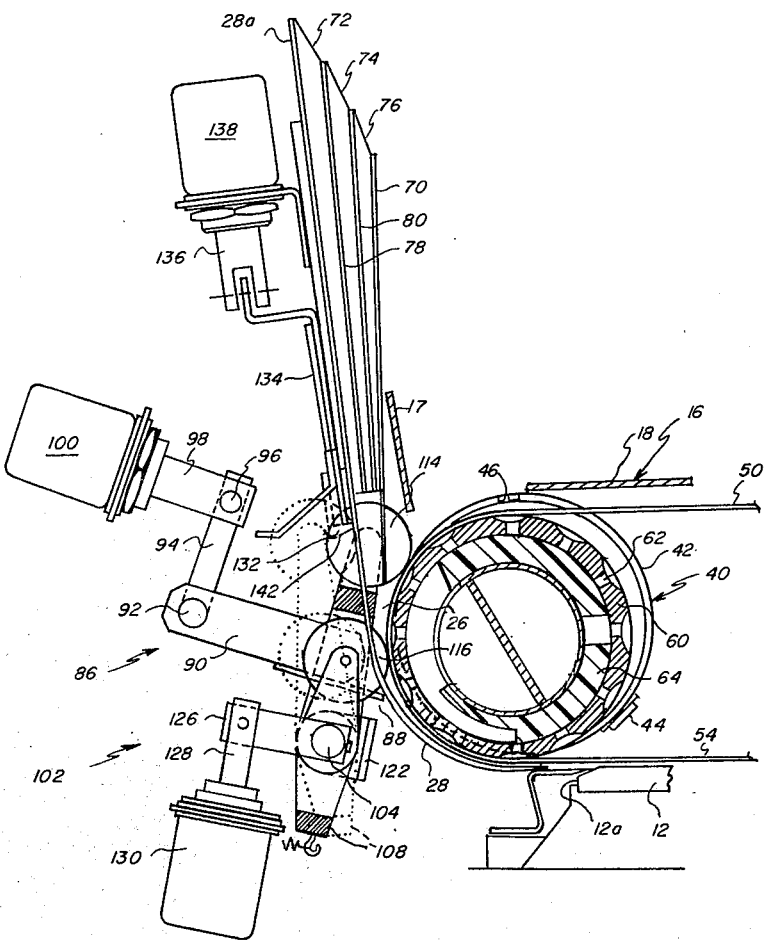
FIG. 2 is an enlarged transverse cross-section of part of the apparatus shown in FIG. 1.
Figure 4:
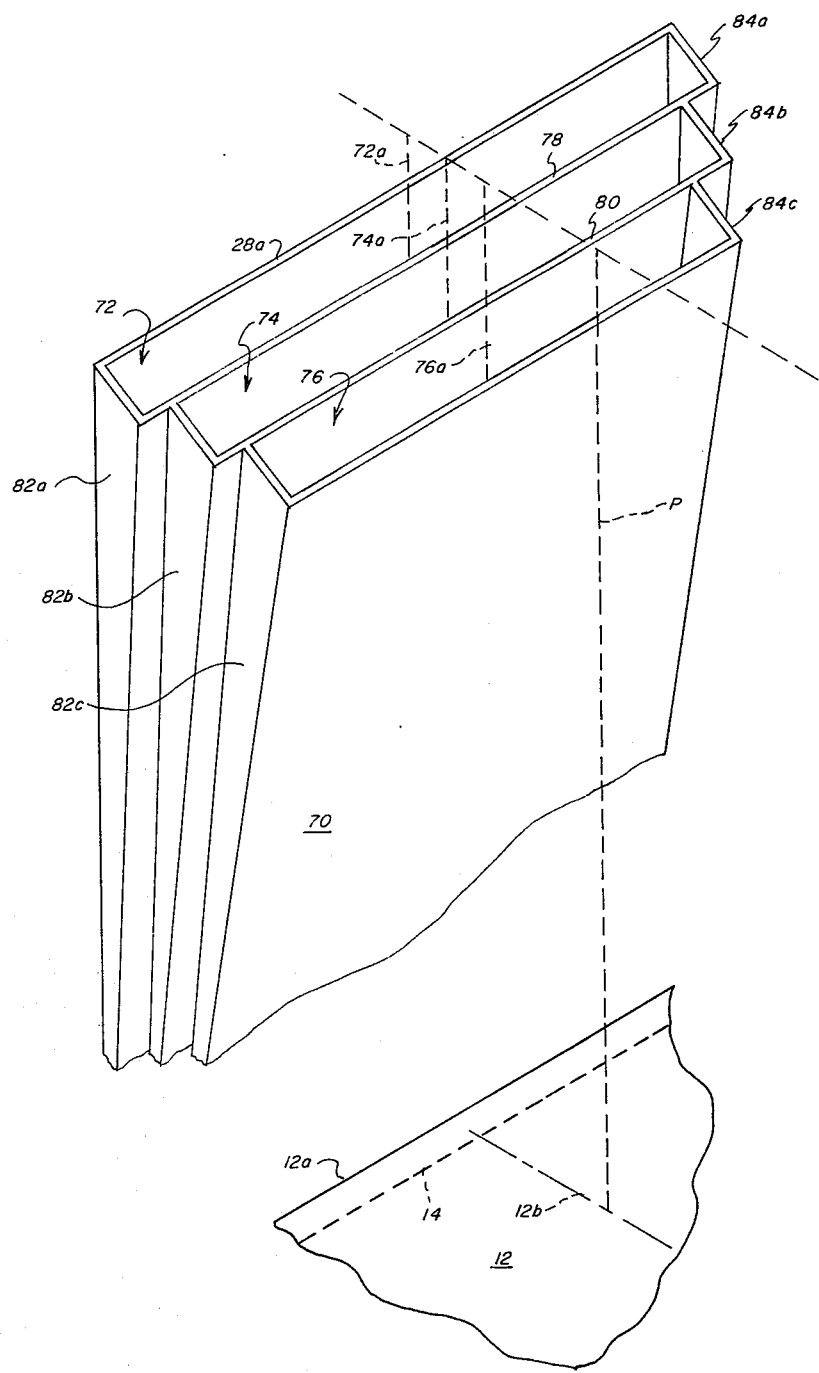
FIG. 4 is a perspective view illustrating the slots used for feeding document sheets of different sizes.

Referring now to FIGS. 1, 2 and 4, the sheet guide 28 comprises a curved lower portion that extends from a position adjacent the end 12a of the platen 12 around the lower and left side of the ring 60, and then has a flat, generally vertically disposed upper end portion 28a that projects above the tray 16 and is located at the left end of the tray. A wall 70 is located between wall 28a and the end wall 17 of tray 16. Wall 70 extends from a position beneath the upper end of wall 28a downwardly to the guide path 26 and to a position between the ring 60 and sheet guide 28. The lower end portion of wall 70 is nearer to wall 28a than is the upper end portion thereof so that wall 70 converges toward the wall 28a.

In the embodiment of the invention illustrated in FIGS. 1, 2 and 4 the space between walls 28a and 70 is divided into three slots 72, 74 and 76 by a pair of intermediate walls 78 and 80. The walls 78 and 80 have lower end portions located above the lower end of wall 70. The upper end portions of walls 78 and 80 are between the upper end of wall 70 and the upper end of wall 28a in a stepped configuration that results in the top of the slots offset vertically from each other. Thus the upper end of slot 72 is above the upper end of slot 76. Also, the upper end of each slot tapers from left-to-right. This construction of the slots facilitates the insertion of a sheet into the individual slots 72, 74 and 76. A shown in FIG. 2, the bottom of each of the guide slots opens into the guide path 26 so that document sheets fed through the slots are delivered into the guide path for transport by the sheet transport mechanism 24.

As best illustrated in FIG. 4, the sides or ends of slots 72, 74 and 76 are closed by a series of end walls 82a–c and 84a–c. Walls 82a and 84a that close slot 72 are spaced apart a distance greater than the walls 82b and 84b that close slot 74. Walls 82b and 84b, in turn, are spaced apart a greater distance than walls 82c and 84c which close slot 76. Thus slot 72 is wider than slot 74 which, in turn, is wider than slot 76. This stepped arrangement of the walls 82 and 84 is such that the vertical center lines 72a, 74a and 76a of the slots are aligned with each other and lie in a plane P that is perpendicular to the upper surface of the platen 12. Plane P passes through the center line 12b of the platen and is perpendicular to registration line 14.

The provision of slots of various widths facilitates proper positioning of a document sheet on the platen. By way of example, assume that slots 72, 74 and 76 are about 14 inches, 10 inches and 8 inches wide, respectively. Then, for a relatively small document sheet, such as a sheet of less than 8 inch size, the sheet preferably is inserted into slot 76 at approximately the center of the slot so that it is fed to the center of the platen 12. Similarly, a sheet larger than about 8 inches but smaller than 10 inches is inserted into slot 74 so that it is properly positioned on the platen. In a like manner, a sheet larger than 10 inches but smaller than approximately 14 inches is inserted into slot 72. Because the center lines 72a, 74a and 76a of the various slots are vertically aligned with the approximate center of the platen 12, the sheets are delivered to the center of the platen.

The arrangement of the slots as described above is used where the optical system of the copier/duplicator requires the document sheet to be registered at the center of registration line 14. Some copiers require registration of the sheet at other locations on the platen, e.g., at a corner of the platen. Therefore, it will be understood that the location of slots 72, 74 and 76 relative to each other and relative to the platen can be varied as required to guide the sheets toward the correct portion of the platen.

A sheet registration mechanism is generally designated 86 in FIGS. 1 and 2. Mechanism 86 has portions movable into a position adjacent to the belt and beneath the slots 72, 74 and 76 to receive and register the lower edge of a document sheet adjacent to the belt prior to the time the sheet is fed to the platen for copying. Mechanism 86 comprises a plurality of fingers 88 that project from arms 90, the arms being rigidly connected to a shaft 92 that is mounted for rotation about its axis. A lever 94 is rigidly secured to shaft 92 and is connected by a pin 96 to the armature 98 of a solenoid 100. When the solenoid 100 is energized the armature 98 is retracted, thereby pivoting lever 94 to rotate shaft 92 in a counterclockwise direction about its axis. Movement of the shaft imparts a similar counterclockwise movement to the arms 90 and fingers 88, thereby to bring the fingers to a sheet-registration position where they extend across the guide path 26. When solenoid 100 is de-energized, fingers 88 can move downwardly out of the registration position to open the guide path 26 and allow the registered sheet to pass through that path toward the platen 12. This downward movement of the fingers 88 can be effected by the force of gravity or by a suitable spring or the like, not shown.

Figure 3:
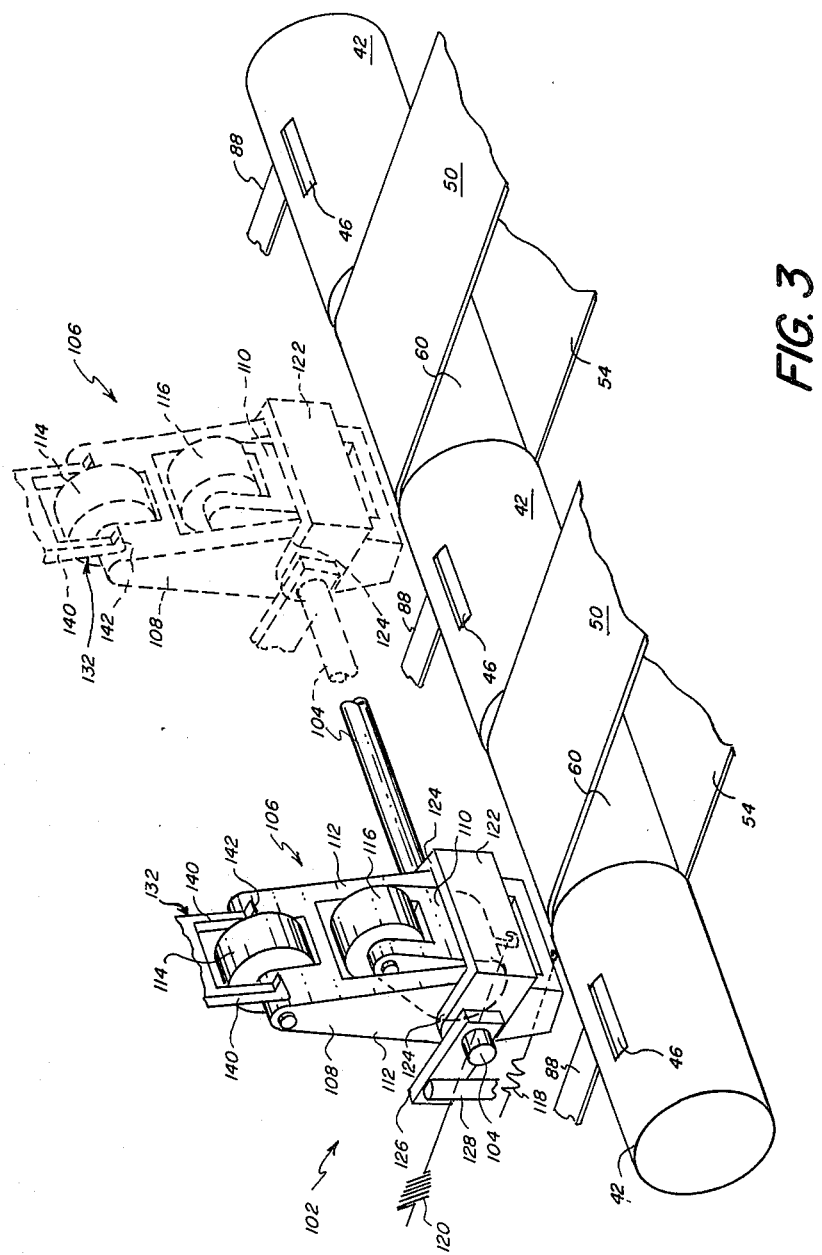
FIG. 3 is a perspective view of part of the apparatus depicted in FIGS. 1 and 2.

Urging means generally designated 102 in FIGS. 1–3 are provided adjacent the bottom of the slots and path 26 for engaging and urging a sheet toward the vacuum belts 50. The urging means comprises a shaft 104 that is located adjacent and behind the sheet guide 28. Mounted on shafts 104 are a plurality of roller assemblies generally designated 106. Each assembly 106 comprises a first roller mounting member 108 and a second roller mounting member 110. Mounting member 108 has legs 112 that straddle the mounting member 110, and both mounting members are mounted for independent pivotal movement on the shaft 104. Each mounting member 108 supports a roller 114 and each mounting member 110 supports a roller 116.

The mounting members and the rollers are urged in a clockwise direction about the shaft 104 by springs shown diagrammatically at 118 and 120 that are connected to the ends of the mounting members 108 and 110, respectively, beneath the axis of shaft 104. The mounting members are moved in the opposite (counterclockwise) direction by means of generally U-shaped brackets 122. The brackets 122 have legs 124 that straddle the legs 112 of the mounting member 108. Legs 124 are rigidly secured to shaft 104 for movement therewith. These brackets and shaft 104 are pivoted by a lever 126 that has one end rigidly secured to the shaft 104 and the other end connected by a pivot to an armature 128 of a solenoid 130. When the solenoid 130 is energized, the armature is retracted, the lever 126 pivots in a counterclockwise direction about the axis of shaft 104 and thereby rotates the shaft 104 and brackets 122 about the axis of the shaft. As this occurs, the center portion of the brackets engage the mounting members 108 and 110 to effect counterclockwise pivotal movement of those members about the axis of the shaft 104. When the solenoid 130 is de-energized the mounting members 108 and 110, and thus the rollers 114 and 116, are urged in a clockwise direction by the springs 118 and 120. As the solenoid is de-energized the force of springs 118 and 120 urges the rollers into engagement with the belts 50 where they travel around the rings 60 as shown in FIG. 2 of the drawings. When the solenoid is energized and the rollers are retracted the lower end of the sheet feeding slots 72-76 are opened to allow a sheet to pass downwardly through the slots and guide path 26 to the registration fingers 88 without interference from the rollers. Then when the rollers 116 are moved toward the belt the rollers urge the sheet against the belt to facilitate tacking of the sheet to the belt by vacuum and advancement of the sheet.

Preferably, the rollers 114 are moved into a position to engage a sheet and urge it against the belts 50 only when sheets are being fed from tray 16 by means of the recirculating document feeder structure, and rollers 114 are held in a retracted position spaced from the belts 50 and away from the guide path 26 when sheets are being fed through slots 72, 74 and 76. Rollers 114 and mounting members 108 can be locked in a retracted position by a latching mechanism comprising latch members 132 (FIGS. 2 and 3) which are connected by a bracket 134 to an armature 136 of a solenoid 138. The connection between the bracket 134 and the armature 136, comprises a pin and slot arrangement which allows the bracket to be moved vertically to some extent without moving the armature 136.

The latch members 132 each comprise a pair of spaced latching fingers 140 (FIG. 3) and the lowermost or free ends of the latch fingers have tapered nose portions 142. The nose portions 142 are sloped and positioned with respect to the upper end portions of the mounting members 108 so that as the mounting members are swung in a counterclockwise direction by operation of solenoid 130, the mounting members strike the nose portions 142 to cam the latch members 132 upwardly and thereby allow passage of the mounting members to a position behind the latch members. After the mounting members are behind the latch members, the latch members move downwardly under the influence of gravity so that the latch fingers then are positioned to latch the mounting members 108 in the retracted position against the force produced by springs 118. This is the position illustrated in FIG. 3. At this time the mounting members 110 and the rollers 116 carried thereby are still free to move between their two positions independently of the movement of the mounting members 108. When it is desired to return the rollers 114 to a position in engagement with the belts 50, solenoid 138 is energized, thereby retracting armature 136 to effect lifting of the bracket 134. This moves the latching fingers 140 upwardly to an extent required to release the mounting members 108. Springs 118 then return the rollers to the position in engagement with the belts 50.

Figure 5:
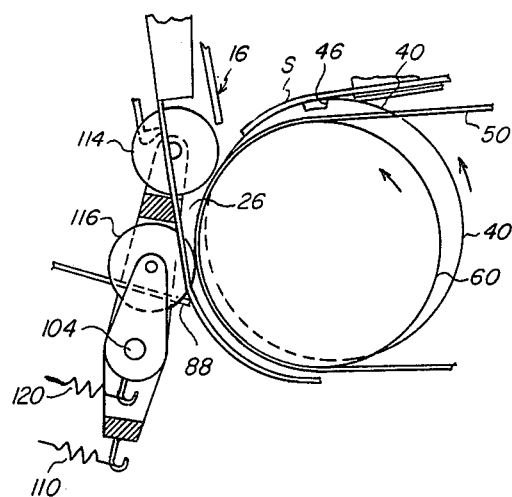
FIGS. 5–7 are fragmentary views illustrating the positions of certain parts during two modes of operation.

Operation of the apparatus will now be described with particular reference being made to FIGS. 5-7. Assume initially that sheets S are to be fed in a recirculating manner from tray 16 to platen 12 for copying and then back to the tray on top of other sheets remaining in the tray. Referring to FIG. 5, in the recirculating mode of operation a sheet S is removed from the bottom of a stack in tray 16 by applying vacuum through ports 46 in the OVF 40 and then moving the OVF in a counterclockwise direction to advance the leading edge of the sheet to the vacuum belts 50. When the leading edge of the sheet reaches the vacuum belts and falls under the influence of vacuum applied through the belts, vacuum can be removed from the OVF and the OVF returned in a clockwise direction back to the position shown in FIG. 5. Then the sheet is advanced by the belts around the rings 60 toward the platen 12. At this time, the sets of rollers 114 and 116, under the influence of springs 118 and 120, urge the document sheet against the belts, thereby facilitating the feeding of the document sheet by the belts. The rollers 114 and 116 are independently urged toward the document sheet. Also at this time, the registration fingers 88 are in their lowered position where they lie outside the guide path 26 so that a removed document sheet can be fed freely through the guide path directly to the platen.

After the sheet is fed to the platen and copied, it is advanced by the vacuum belts 50, through slot 30 and into the nip between the first set of rollers 36, 38. The various sets of rollers 36, 38 drive the sheet through the inverting path 34 and return the sheet into the tray 16 on top of other sheets as remaining in the tray.

Figure 6:
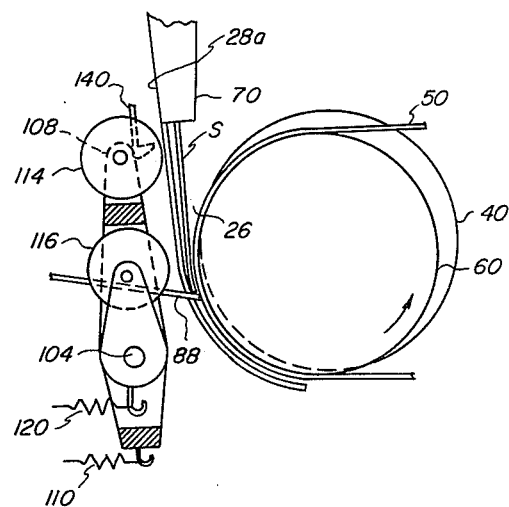
Figure 7:
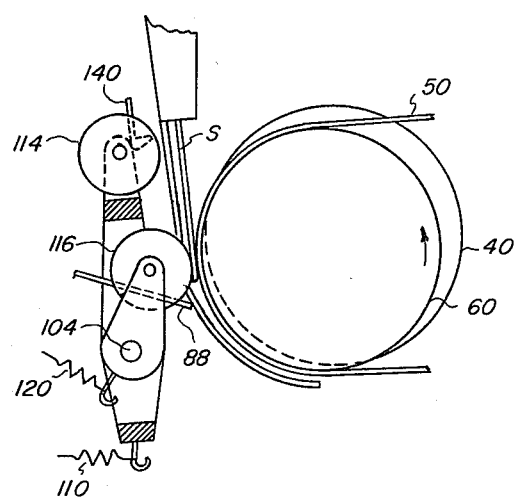

Referring now to FIGS. 6 and 7, when a sheet is to be fed to the platen for copying in the document positioner mode of operation, the vacuum supply is shut off and solenoids 100 and 130 are energized. When solenoid 100 is energized, it brings the registration fingers 88 to their raised position where they extend across the path 26 so that a sheet S can engage and rest on the fingers 88 to preregister the sheet prior to its advancement to the platen. When solenoid 130 is energized, it effects movement of the sets of rollers 114 and 116 to their respective retracted positions, as shown in FIG. 6, where they are spaced from the guide path 26 and therefore do not interfere with downward movement of a sheet S through that guide path and into engagement with the registration fingers 88.

As the upper rollers 114 move to the retracted position illustrated in FIG. 6, the upper end of each of the roller mounting members 108 strikes the nose portion 142 of the associated latching finger 140, thereby to effect upward movement of the latching fingers until such time as the mounting members 108 pass beneath the latch fingers. Then the latch fingers drop downwardly to the position shown in FIG. 6 and in FIG. 3 where they are effective to hold the mounting members 108, and thus the rollers 114, in their retracted position. Rollers 116, on the other hand, are held in their retracted positions solely by the operation of the solenoid 130 acting through the bracket 122. This conditioning of the feeder for the document positioner mode of operation can be accomplished by a switch (not shown) that can be attached to the top of wall 70, for example, and actuated by a cover (not shown) normally covering the upper ends of slots 72, 74 and 76. Thus when the cover is opened to provide access to the slots, the feeder is automatically placed in condition for the document positioner mode of operation. Of course, this conditioning also can be accomplished manually by, for example, a switch actuator on a control panel.

The sheet to be copied is inserted through one of the slots 72, 74, or 76 (depending on the size of the sheet). The sheet drops through the lower end of the slot into the guide path 26 and it is registered on the fingers 88. Next solenoid 130 is de-energized, and the rollers 116 are free to return toward the belts 50 under the influence of springs 120. The rollers thus engage the lower end portion of the sheet S and urge the sheet firmly against the vacuum belts 50 as shown in FIG. 7. At this time the vacuum supply is turned on and the lower end of the sheet is urged against the vacuum belts. Then solenoid 100 is de-energized, and the registration fingers 88 drop downwardly to the position shown in FIG. 7 where they lie outside of the guide path 26. Then sheet S can be advanced to the platen by the vacuum belts 50.

After the sheet S has been exposed on the platen 12, it is driven through the slot 30 by the vacuum belts 50 and into the nip of the first pair of rollers 36, 38. At this time, the sheet deflector 144 is moved to its raised position so that a sheet delivered by the document positioner to the platen is discharged from the platen and directed into a guide path 146 leading to a tray (not shown).

When the apparatus is to be converted from operation in the document positioner mode, as shown in FIG. 7, to the recirculating feeder mode, as shown in FIG. 5, solenoid 138 is energized momentarily, thereby causing the bracket 134 to be raised so that the nose portions 142 of the latch members 132 are lifted sufficiently to allow the roller mounting members 108 to move in a clockwise direction under the influence of springs 118. The rollers 114 then returns to the position shown in FIG. 5. Then solenoid 138 is de-energized and the latch fingers 140 again drop to the position where they are available for latching rollers 114 in their retracted position again.

The various functions of the apparatus disclosed herein can be controlled in any suitable manner as, for example, by providing a logic and control unit 148 (LCU) which is coupled to drive motor 58, solenoids 100, 130, and 138 and sheet deflector 144 as illustrated in FIG. 1. Similarly, various sensors (not shown) can be coupled to the LCU so that other portions of the apparatus can be controlled automatically. For example, a sensor can be provided for detecting the presence of the sheet in guide path 26 (or elsewhere), for stopping the sheet at registration edge 14 and exposing the sheet after it is stopped as disclosed in the beforementioned copending U.S. patent application. In addition, if desired, the various solenoids, deflectors, and the like can be manually controlled by the machine operator.

Figure 8:
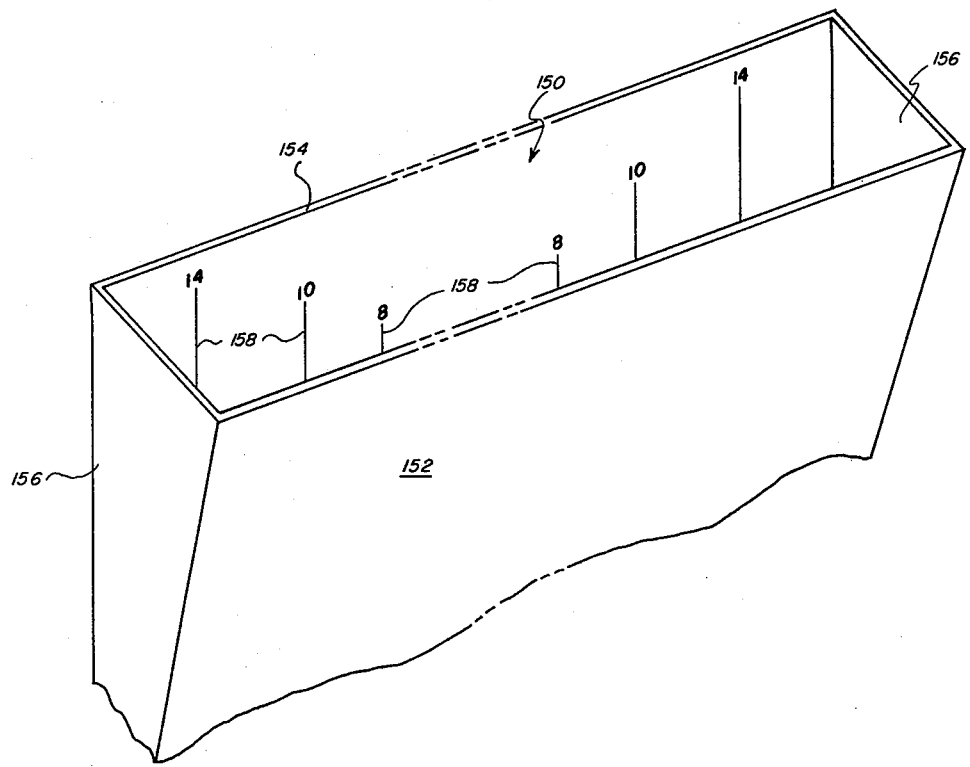
FIG. 8 is a perspective view similar to FIG. 4 but showing an embodiment of the invention wherein a single slot with indicia is used for locating document sheet of different sizes.

In the embodiment previously described, a plurality of guide slots 72, 74, and 76 are provided for various sizes for document sheets that were to be fed to the platen by means of the document positioner apparatus. As shown in FIG. 8, the three guide slots can be replaced with a single guide slot 150 formed by front and rear walls 152 and 154, respectively and by end walls 156. Preferably, the walls are arranged so that the guide slot tapers inwardly and downwardly. Note that the top of the walls forming the slot are offset vertically to facilitate insertion of a sheet into the slot. In this embodiment, suitable indicia 158 can be provided on a surface of one of the walls, such as wall 154, to illustrate the approximate position of document sheets of particular sizes that are to be fed to the platen. Thus, the inner two indicia 158 show the location of a sheet having an eight-inch dimension, the next two indicia 158 illustrate the position for a ten-inch dimension document sheet, and the last two indicia are for a wider, fourteen-inch document sheet. The guide slot 150 is simpler in construction but requires only slightly more operator intervention in order to properly position document sheets.

The invention has been described in detail with particular reference to preferred embodiments thereof, but it will be understood that variations and modifications can be effected within the spirit and scope of the invention.

We claim:

1. In apparatus for feeding document sheets to an exposure position, the apparatus having means for feeding a sheet to the exposure position along a recirculating sheet path or along a non-recirculating sheet path, the feeding means having at least one drive belt for moving a sheet traveling along either sheet path past the exposure position, the belt being supported for movement along an arcuate path and then along a straight path leading past the exposure position, the improvement comprising:

means defining a generally vertically disposed slot (i) havng a first opening for receiving a sheet to be fed along the non-recirculating path and (ii) having a second opening located adjacent to the arcuate path so that a sheet can pass through the second opening and be delivered to a position adjacent and alongside the arcuate path of the belt;

a roller adjacent the second opening engageable with the belt in the arcuate path of the belt, and means for urging the roller toward the arcuate path of the belt so that a sheet delivered from the second opening of the slot or fed along the recirculating sheet path is urged against said belt in said arcuate path, the belt being effective to move the sheet from the arcuate path along said straight path to the exposure position.

2. In apparatus for feeding document sheets to an exposure position, the apparatus having means for feeding a sheet to the exposure position along a recirculating sheet path or along a non-recirculating sheet path, the feeding means having at least one drive belt for moving a sheet traveling along either sheet path past the exposure position, the improvement comprising:

means defining a generally vertically disposed guide slot for receiving a document sheet that is to be fed along the non-recirculating sheet path, the slot defining means having a first opening for receiving a sheet and having a second opening adjacent to the belt so that a sheet can be delivered through the second opening to the belt;

a roller mounted for movement between (i) a first position spaced from the belt so that a sheet delivered through the slot can be received between the roller and the belt and (ii) a second position for holding a sheet against the belt during feeding of sheets along either the recirculating sheet path or the non-recirculating sheet path; and means for moving the roller between its first and second positions.

3. The invention as set forth in claim 2 further comprising sheet registration means located beneath the second opening of the slot for registering a sheet adjacent to the belt, and means for retracting the registration means to allow advancement of the sheet by the belt.

4. The invention as set forth in claim 2 further comprising means defining a second generally vertically disposed slot having a first opening for receiving a sheet and having a second opening located adjacent to the arcuate section so that the sheet passes through the second opening and is delivered to the arcuate section of the transport means, the two slots being adjacent to each other, and one slot being wider than the other slot whereby the slots can accommodate sheets of different sizes.

5. The invention as set forth in claim 4 wherein the first opening of the second slot is offset vertically from the first opening of the other slot, thereby to facilitate insertion of sheets into a selected one of the slots.

6. The invention as set forth in claim 2 wherein one side of the opening at the top of the slot is offset vertically above the other side of the opening, and the one side of the opening has indicia thereon for locating sheets of various sizes.

7. In apparatus for feeding document sheets to an exposure position, the apparatus having means for feeding a sheet to the exposure position along a recirculating sheet path or along a non-recirculating sheet path, the feeding means having at least one vacuum belt for moving a sheet traveling along either sheet path past the exposure position, the improvement comprising:

means defining a generally vertically disposed guide slot for receiving a document sheet that is to be fed along the non-recirculating sheet path, the slot defining means having an opening adjacent to the belt so that a sheet can be delivered through the opening to the belt;

sheet registration means having registration members movable between (i) a first position located beneath the slot opening and adjacent to the belt in a position to receive and register an edge of a document sheet adjacent to the belt and (ii) a second position spaced from the slot so that a document sheet can be advanced by the belt;

means for moving the sheet registration members between their first and second positions;

first and second rollers mounted for independent movement between (i) a first position spaced from the belt so that a sheet delivered through the slot can pass between the rollers and the belt for engagement with the registration means and (ii) a second position for holding a sheet against the belt; and means for latching the second roller in its first position during feeding of a sheet along the non-recirculating sheet path and for releasing the second roller for movement to its second position when a sheet is to be fed along the recirculating sheet path.

8. The invention as set forth in claim 7 further comprising a first roller mounting member supporting the first roller and a second roller mounting member supporting the second roller, a shaft supporting said mounting members for pivotal movement about the axis of the shaft, and means simultaneously engageable with both of said mounting members to move said mounting members and thereby move the rollers friom their respective second positions to their respective first positions.

9. The invention as set forth in claim 7 further comprising a second slot located adjacent the first slot, the second slot having an opening at the top to receive a document sheet and an opening at the bottom adjacent to the belt so that a sheet can be delivered through the second slot to the belt, and the second slot being smaller in width than the first slot.

* * * * *